(12) United States Patent
Bhanpurawala et al.

(10) Patent No.: US 10,577,835 B2
(45) Date of Patent: Mar. 3, 2020

(54) CABLE LOCKOUT ASSEMBLY

(71) Applicant: LOTO SAFETY PRODUCTS DMCC, Dubai (AE)

(72) Inventors: Yusufi Fakhruddin Bhanpurawala, Dubai (AE); Lai Qiyang, Dubai (AE); Qaid Zohar Zakiuddin Shahpurwala, Dubai (AE)

(73) Assignee: LOTO SAFETY PRODUCTS DMCC, Dubai (AE)

( * ) Notice: Subject to any disclaimer, the term of this patent is extended or adjusted under 35 U.S.C. 154(b) by 0 days.

(21) Appl. No.: 15/747,316

(22) PCT Filed: Jul. 11, 2017

(86) PCT No.: PCT/IB2017/054170
§ 371 (c)(1),
(2) Date: Jan. 24, 2018

(87) PCT Pub. No.: WO2018/115989
PCT Pub. Date: Jun. 28, 2018

(65) Prior Publication Data
US 2018/0371791 A1    Dec. 27, 2018

(30) Foreign Application Priority Data
Dec. 20, 2016 (IN) .............................. 201641043505

(51) Int. Cl.
*E05B 73/00* (2006.01)
*E05B 67/00* (2006.01)
(Continued)

(52) U.S. Cl.
CPC ............ *E05B 73/0005* (2013.01); *E05B 5/00* (2013.01); *E05B 65/0007* (2013.01); *E05B 67/003* (2013.01); *F16K 35/06* (2013.01)

(58) Field of Classification Search
CPC .. E05B 67/003; E05B 67/006; E05B 73/0005; E05B 73/0011; E05B 65/0007
See application file for complete search history.

(56) References Cited

U.S. PATENT DOCUMENTS 1,520,902 A * 12/1924 Junkunc ................ E05B 67/003
70/49
1,746,090 A * 2/1930 Rechter ................... F16G 11/06
403/206
(Continued)

FOREIGN PATENT DOCUMENTS

CN          203034965 U    7/2013
GB          2 304 795 A    3/1997

OTHER PUBLICATIONS

International Search Report for PCT/IB2017/054170, dated Sep. 11, 2017, 5 pgs.
(Continued)

*Primary Examiner* — Christopher J Boswell
(74) *Attorney, Agent, or Firm* — Patterson Thuente Pedersen, P.A.

(57) ABSTRACT

A cable lockout assembly to tightly secure a cable that is arranged in a looped configuration with valves or switches in an ON/OFF or partial ON condition. A base includes a through passage for the cable. A rotatable piece is mated relative to the base for rotation about a central axis screw. The rotatable piece can be confined to the base by a conical washer on the central axis screw. A tool for rotating the rotatable piece engages with clamping force with the rotatable piece to fasten or unfasten the cable inserted in the through passage by fastening the rotatable piece over the base when the cable is placed in between the rotatable piece and the base. A cable manner is also employed to hold the wound cable and prevent loss of cable when the lockout is not in use.

7 Claims, 3 Drawing Sheets

(51) Int. Cl.
*F16K 35/06* (2006.01)
*E05B 5/00* (2006.01)
*E05B 65/00* (2006.01)

(56) References Cited

U.S. PATENT DOCUMENTS

| | | | | |
|---|---|---|---|---|
| 3,044,807 | A * | 7/1962 | Brisse | E04H 12/20 24/134 R |
| 3,841,118 | A * | 10/1974 | Stone | E05B 67/003 70/33 |
| 4,438,642 | A * | 3/1984 | De Jong | E05B 73/00 70/232 |
| 4,702,443 | A * | 10/1987 | Callaway | F16L 3/00 24/132 AA |
| 4,979,382 | A * | 12/1990 | Perry | E05B 73/0005 248/553 |
| 5,398,530 | A * | 3/1995 | Derman | H01R 13/60 439/133 |
| 5,531,083 | A * | 7/1996 | Franck, III | E05B 73/0005 70/49 |
| 5,823,020 | A * | 10/1998 | Benda | E05B 67/003 70/18 |
| 5,881,582 | A * | 3/1999 | Monaco | E05B 67/383 70/14 |
| 5,918,490 | A * | 7/1999 | Lion | A63B 55/408 206/315.3 |
| 6,401,504 | B1 * | 6/2002 | Derman | E05B 67/383 70/230 |
| 6,997,420 | B2 * | 2/2006 | Yudis | F16L 35/00 248/89 |
| 7,272,962 | B2 * | 9/2007 | Benda | E05B 67/006 70/18 |
| 7,784,313 | B2 * | 8/2010 | Wyers | E05B 67/003 70/14 |
| 7,870,767 | B2 * | 1/2011 | Brojanac | E05B 67/383 137/385 |
| 8,245,371 | B2 | 8/2012 | Chen | |
| 9,618,135 | B1 * | 4/2017 | Kjar | F16K 31/60 |
| 2004/0065126 | A1 * | 4/2004 | Yang | E05B 67/003 70/58 |

OTHER PUBLICATIONS

Written Opinion of the International Searching Authority for PCT/IB2017/054170, dated Sep. 11, 2017, 4 pgs.

* cited by examiner

CABLE LOCKOUT ASSEMBLY

RELATED APPLICATIONS

The present application is a National Phase entry of PCT Application No. PCT/IB2017/054170, filed Jul. 11, 2017, which claims priority from IN Patent Application No. 201641043505, filed Dec. 20, 2016, said applications being hereby incorporated by reference herein in their entirety.

TECHNICAL FIELD

The present disclosure generally relates to the field of valves. Particularly, but not exclusively, the present disclosure relates to the construction and mechanism of a locking device for valves. Further, embodiments of the present disclosure disclose a cable lockout assembly for locking the valve.

BACKGROUND

Generally, valves are used in industries for various type of applications. For example, gate valves are used in many industries for controlling the flow of high pressure gases or fluids. Such applications include usage of ON or OFF, or partially ON gate valves. However, one major limitation of such valves is that improper actuation/operation of these valves can cause damage to the surrounding machinery as well as jeopardize the safety of human lives in the surrounding area. Additionally, in some cases there is a need to ensure that an unauthorized person cannot operate the valve in a critical machine or a special device.

With the ongoing advancement of technology in the field of valves, manufacturers have been developing devices/arrangements for securing/locking the valves so as to prevent improper or unauthorized actuation of the valve. One such locking device is a cable lockout device, which is used for locking the valve with the help of a flexible elongated cable. The cable lockout is adapted to immobilize the handles of the valve or switch by locking a cable tied with a valve handle and frame/body of the valve assembly, thereby preventing the valve or switch from being turned or actuated.

There are various locking arrangements employed in the industry. One such locking arrangement includes a cable and a cable locking mechanism, whereby a cable loop is formed around a member of the valve or switch that needs to be secured. The ends of the cable are secured by the cable lockout mechanism. A locking arrangement using this technique can provide a tight locking loop irrespective of the size of the valves. However, these arrangements require many moving parts or one or more internal keys for operating the locking mechanism which makes it difficult to use and handle.

The present disclosure is directed to overcome the above stated problems or other similar problems associated with the prior art.

SUMMARY

One or more shortcomings of the existing locking arrangements is overcome by a cable lockout assembly as claimed in the present disclosure and additional advantages are provided through the construction and mechanism of the cable lockout assembly as claimed in the present disclosure.

Additional features and advantages are realized through the techniques of the present disclosure. Other embodiments and aspects of the disclosure are described in detail herein and are considered a part of the claimed disclosure.

In a non-limiting embodiment of the present disclosure, a cable lockout assembly is disclosed. The cable lockout assembly comprises a base having a threaded protuberance extending centrally above the said base and a through-passage extending between two diametrically opposite pair of openings formed on the outer peripheral wall of the base for inserting therethrough a cable. The cable lockout assembly further comprises a rotatable piece having a first central opening for receiving the threaded protuberance of the base. The rotatable piece is rotatable about the axis of the threaded protuberance wherein the rotation of the rotatable piece axially moves the rotatable piece along the axis of the threaded protuberance relative to the base. The cable lockout assembly further comprises a tool, having a second central opening for receiving the threaded protuberance and a first profile engageable with a second profile of the rotatable piece wherein rotation of the tool rotates the said rotatable piece thereby adjusting the clamping force exerted on portion of the cable interposed between the rotatable piece and the base in the through-passage.

In an embodiment, a stopper device is disposed at a distal end of the threaded protuberance to prevent disengagement of the rotatable piece from the base.

In an embodiment, the base has a plurality of spaced locking apertures alignable with a plurality of spaced locking apertures disposed in the rotatable piece and tool respectively, for receiving a locking device to lock the relative rotation of the tool, the rotatable piece and the base.

In an embodiment, the first profile of the tool comprises an external gear profile, and the second profile of the rotatable piece comprises an internal gear profile engageable with the external gear profile of the first profile.

In an embodiment, the rotatable piece comprises a nut disposed centrally. The said nut has internal threads configured to engage with the threaded protuberance of the base. In an embodiment, the cable lockout assembly secures the cable in a looped configuration.

In an embodiment, the cable lockout assembly further comprises a cable manager apparatus for holding the wounded cable, wherein the cable manager apparatus comprising an S-shaped clip mounted on the base by means of a clamp plate and a set of screws. In an embodiment, the stopper device is a conical washer disposed on the distal end of the threaded protuberance.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
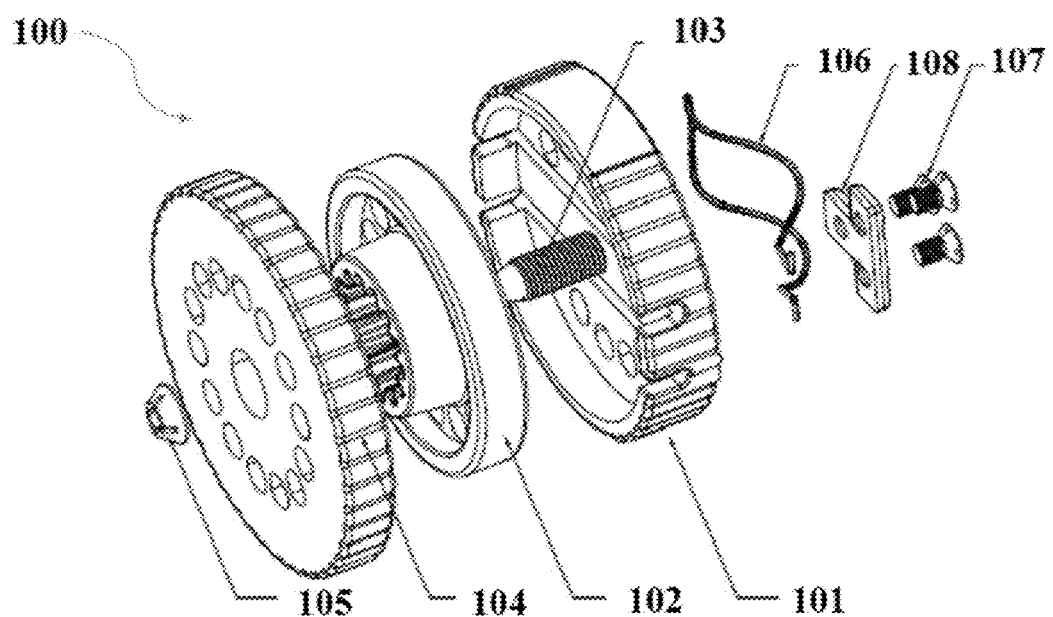
FIG. 1 depicts an exploded view of a cable lockout assembly in accordance with an embodiment of the present disclosure.

The figures depict embodiments of the disclosure for purposes of illustration only. One skilled in the art will readily recognize from the following description that alternative embodiments of the system and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a cable lockout mechanism or a cable lockout assembly to immobilize a cable wound around an actuation handle of a valve or switch to lock the valve or switch in a desired position. The cable lockout assembly primarily comprises a base, a rotatable piece, a tool and a cable manager apparatus. A cable is wound between an actuation handle of at least one valve and an actuation handle of one or more other valves or any other stationary part nearing the at least one valve. For the purpose of locking a valve, the actuation handle of the valve is required to be immobilized for controlling/restricting flow of gases or fluids that may require the valves or switches to be in ON or OFF or partially ON conditions based on the application.

In an embodiment, the cable lockout assembly comprises a base, a rotatable piece and a tool. The base has a through passage for receiving the ends of a looped cable. The base has two diametrically opposite pair of openings formed on the outer peripheral wall of the base and between which the through passage extends. The base has a threaded protuberance which extends upwardly in a right angle with the base. The threaded protuberance has external threads and extends from the center of the base, thereby, the threaded protuberance forms a central axis screw. In an embodiment, the rotatable piece has a first central opening or a bore for receiving the threaded protuberance of the base. The first central opening or bore has internal threads adapted to cooperate with the external threads of the threaded protuberance such that the rotatable piece is rotatable about the axis of the threaded protuberance and is axially moveable along the axis of the threaded protuberance. As the rotatable piece moves towards the base, a clamping force is exerted on a portion of the cable interposed between the rotatable piece and the base. It can be clearly understood that depending on the direction of rotation, the rotatable piece relatively moves towards or away from the base. Thus, the clamping force exerted on the portion of the cable interposed between the base and the rotatable piece can be adjusted. Accordingly, the rotatable piece acts as a clamping element to lock the cable inserted in the through passage by rotating or fastening the rotatable piece about the axis of the threaded protuberance, towards the base.

In an embodiment, the rotatable piece is adapted to be rotated by means of a tool. The tool has a second central opening for receiving the threaded protuberance projected through the first central opening of the rotatable piece. In an embodiment, the tool has a second profile engageable with a first profile provided in the rotatable piece. The second profile has an external gear profile concentric with the second central opening of the tool. The first profile has an internal gear profile concentric with the first central opening of the rotatable piece and engageable with the external gear profile of the second profile. The engagement of the first and second profiles is adapted to provide a positive connection between the tool and the rotatable piece such that by rotating the tool, the rotatable piece can be rotated.

As explained in previous paragraphs, a clamping force is exerted by fastening the rotatable piece over the base when the cable is placed between the rotatable piece and the base and thus secures the cable. In a non-limiting embodiment, the cable can be made from a group of yarns, plies, or strands of any combination of different materials thereof that can be twisted or braided together into a larger and stronger form. Any cable which can be fitted in the through passage of the base can be used for the purpose of locking/immobilizing the valves.

In an embodiment, to prevent disengagement of the rotatable piece from the threaded protuberance of the base, a conical washer is disposed at a distal end of the threaded protuberance. The 'distal end' of the threaded protuberance is an end which located away from the base. The conical washer acts as a stopper device.

Both ends of cable loop can be fixed and adjusted relative to the cable lockout assembly by sliding the cable lockout assembly along the cable until a tight locking loop is created so that no adjustments in the valves or the switches can be made without removing the cable lockout assembly. The rotation of the rotatable piece will be possible only if the tool is engaged to the rotatable piece. As explained in previous paragraphs, in an embodiment, the rotatable piece will be one time confined with respect to the base with the aid of conical washer in the initial stage.

In an embodiment, the base, rotatable piece and tool have a plurality of equally spaced locking apertures. The locking apertures of the base are alignable with the locking apertures present in the rotatable piece and tool. In other words, the locking apertures on the base, tool and the rotatable piece are formed such that upon rotation of the tool, the said locking apertures of the tool and the rotatable piece can be aligned for receiving a locking device. The locking device can be a padlock to prevent unfastening or rotation of the tool and the rotatable piece relative to the base. By padlocking the cable lockout assembly, any unauthorized person is prevented from operating the valves or switches. The valves or switches can be adjusted after removing the padlock from the spaced locking apertures and unfastening the rotatable piece by means of the tool. The cable lockout device can accommodate one or more padlocks depending upon the number of locking apertures available on the cable lockout device. As the tool is not fixed to any of the other parts, it can be removed after fastening the rotatable piece. The cable lockout assembly can be padlocked with/without the tool depending upon the operator's requirement. The padlock is a portable lock with a shackle that may be passed through an opening (such as a chain link, or hasp staple) to prevent use, theft, vandalism or tampering made to the lockout assembly and can be locked/unlocked by a key. Any padlock of suitable shackle size that can fit into the locking apertures can be used in the lockout assembly of the present disclosure.

In an embodiment, an operator may position a tag over any of the spaced locking apertures. The tag may carry any important information related to the use of valves.

In an embodiment, the cable lockout assembly comprises an S-shaped cable manager apparatus for holding wound cable. The said cable manager apparatus comprises an S-shaped curved wire (interchangeably referred to as an 'S-shaped cable clip') mounted to the rear face of the base by means of clamp plate and a set of screws. The 'rear face' of the base is the surface located opposite to the face through which the threaded protuberance extends. When the lockout assembly is not in use, the cable can be wound manually and held into the S-shaped cable manager apparatus, thereby preventing loss of the cable (as the device cannot work without the cable) and ensuring its availability for further use. If the operator doesn't have the key for the padlock or the tool to rotate and unfasten the rotatable piece, the only method of adjustment of the valves is by snapping or cutting off the cable. The cable lockout assembly and the cable may be manufactured out of plastic or metal or a combination of both. In any event the cable lockout assembly or the cable can be manufactured by other inexpensive materials in any desired configuration.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2:
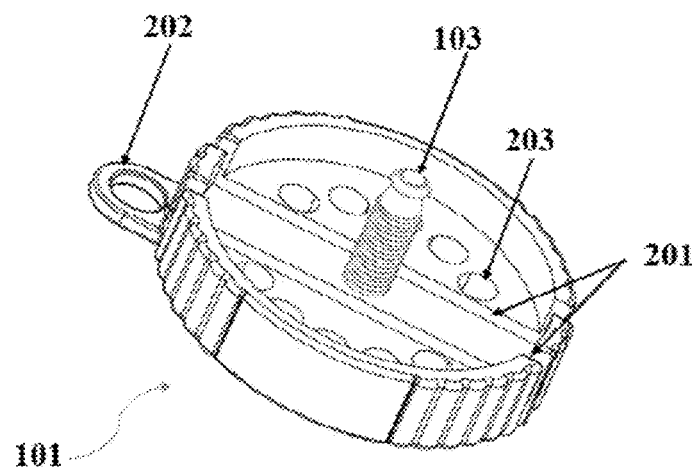
FIG. 2 depicts the base of the cable lockout assembly in accordance with an embodiment of the present disclosure.

Referring to FIGS. 1 and 2, the cable lockout assembly 100 comprises a base 101, a rotatable piece 102 and a tool 104. A cable 502 can be inserted between the rotatable piece 102 and the base 101. For this purpose, the base 101 is provided with a through passage 201 which extends between two diametrically opposite pair of openings formed on the outer peripheral wall of the base 101. The base 101 has an axial screw or threaded protuberance 103 located centrally on the base 101 and extending perpendicularly from the base 101. The threaded protuberance 103 has external threads.

Figure 3:
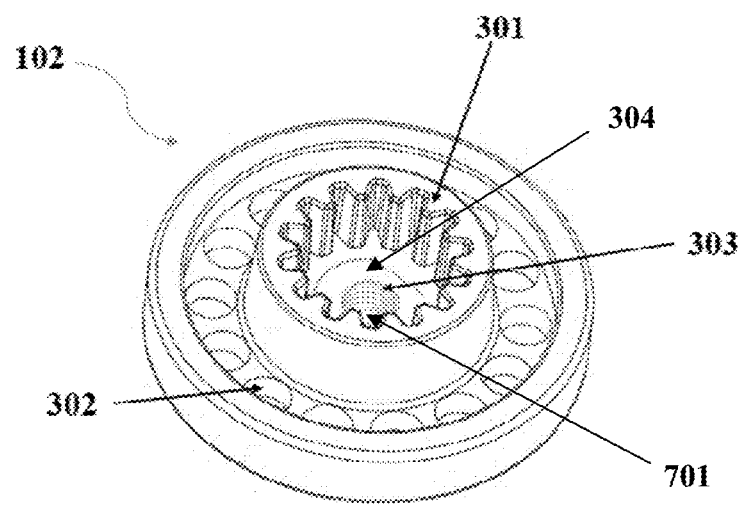
FIG. 3 depicts the rotatable piece of the cable lockout assembly in accordance with an embodiment of the present disclosure.

Referring to FIGS. 2 and 3, the rotatable piece 102 has a first central opening 701 or bore for receiving therethrough the threaded protuberance 103. The first central opening or the bore is provided with internal threads 303 for threadedly engaging with the external threads of the threaded protuberance 103. The threaded protuberance 103 is an integral part of the base 101. As explained in previous paragraphs, the rotatable piece 102 can be rotated about the axis of the threaded protuberance 103 and as the rotatable piece 102 rotates, it moves axially along the axis of the threaded protuberance 103 towards or away from the base 101. Thus, the rotatable piece 102 can be fastened or unfastened over the threaded protuberance 103 thereby tightening or loosening the clamping force over the cable 502 interposed between the base 101 and the rotatable piece 102.

Figure 5:
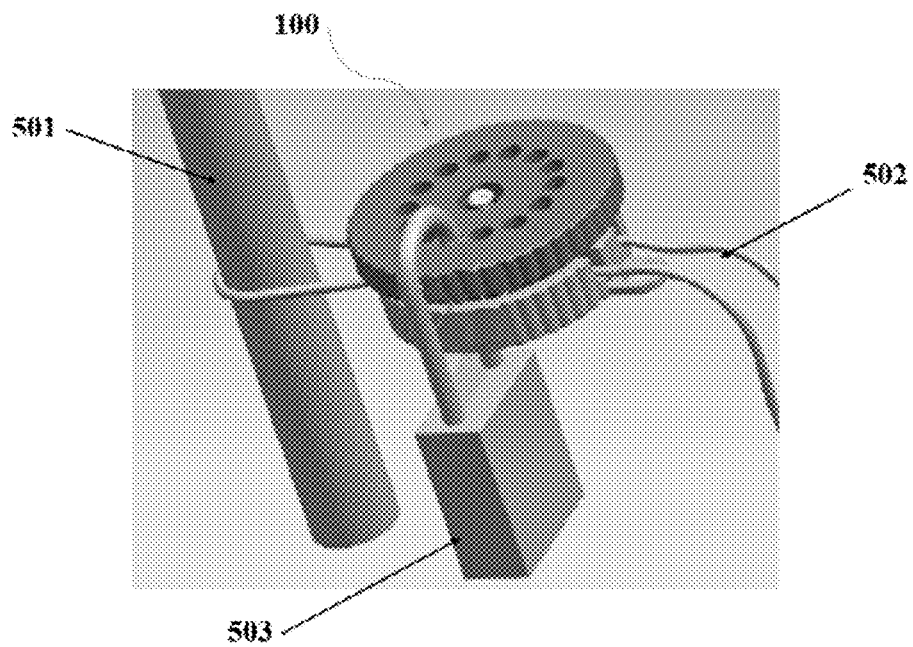
FIG. 5 is an exemplary illustration of use or operation of the cable lockout assembly in accordance with an embodiment of the present disclosure.

As shown in FIGS. 1 and 5, a conical washer 105 is disposed over the rotatable piece 102 on a distal end of the threaded protuberance 103 to confine the rotatable piece 102 to the base 101. The conical washer 105 acts as a stopper device and prevents separation of the rotatable piece 102 from the threaded protuberance 103.

Figure 4:
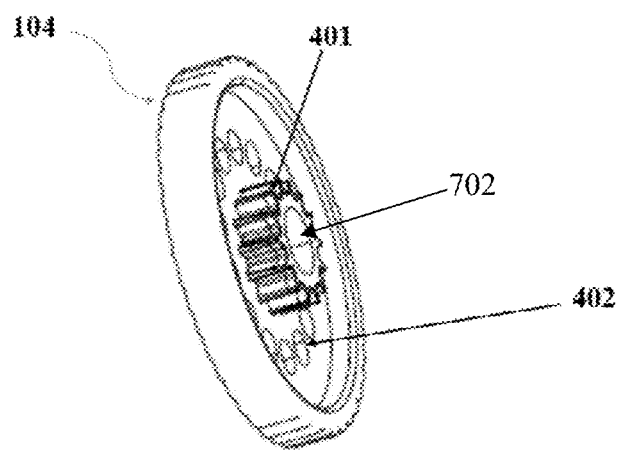
FIG. 4 depicts the tool of the cable lockout assembly in accordance with an embodiment of the present disclosure.

Referring to FIGS. 1, 3 and 4, the tool 104 has a second central opening 702 for receiving the threaded protuberance 103 projected through the first central opening 701 of the rotatable piece 102. The tool 104 has a second profile engageable with a first profile provided in the rotatable piece 102. The second profile has external gear profile 401 concentric with the second central opening 702 of the tool 104. The first profile has internal gear profile 301 concentric with the first central opening 701 of the rotatable piece 102 and engageable with the external gear profile 401 of the second profile. In an embodiment, the external gear profile 401 may be a male gear profile and the internal gear profile 301 may be a female gear profile. The engagement of the first and second profiles is adapted to provide a positive connection between the tool 104 and the rotatable piece 102 such that by rotating the tool 104, the rotatable piece 102 can be rotated about the axis of the threaded protuberance 103. Thus, the rotatable piece 102 can be fastened over the base 101 by rotating the tool 104. The tool 104 can be attached with or removed from the rotatable piece 102.

Referring to FIGS. 1 and 3, the rotatable piece 102 comprises a plurality of circumferentially spaced apart apertures 302 which provide a profile for the locking device such as padlocks to be inserted. In an embodiment, the apertures 302 on the rotatable piece 102 are equidistant. Referring to FIGS. 1 and 2, the base 101 comprises a plurality of circumferentially spaced apart apertures 203. In an embodiment, the apertures 203 on the base 101 are equidistant. As shown in FIG. 5, the apertures 302 on the rotatable piece 102 are disposed such that the apertures 302 get aligned with the apertures 203 of the base 101 as the rotatable piece 102 is fastened over the base 101. Thus, providing a profile for receiving the shackle of the padlock and locking the rotatable piece 102 with the base 101 from relative rotation.

In an embodiment, the rotatable piece 102 comprises a nut 304 disposed centrally. The said nut has internal threads configured to engage with the threaded protuberance 103 of the base 101. The nut 304 can be insert moulded into the rotatable piece 102.

Referring to FIG. 4, the tool 104 may be provided with a plurality of equidistant circumferentially spaced apart apertures 402 to provide a profile for inserting the padlocks and locking the tool 104 along the rotatable piece 102 with the base 101.

Referring to FIG. 5, a valve 501 is locked by a cable 502 from displacement. A cable 502 loop is formed around the valve 501 and a rigid stationary body (not shown in FIG.) to secure the valve in an open or closed position, as desired. Then free ends of the said loop are received in the cable lockout assembly 100 through the pair of openings on the side peripheral wall of the base 101 and via a through passage 201. Once the ends of the cable 502 are received via the through passage 201 of the base 101, the rotatable piece 102 can be rotated by means of the tool 104 until a tight locking loop is created so that no movement/displacement in the valves or the switches can be made without removing the cable lockout assembly 100. As shown in FIG. 5, a padlock 503 is inserted in the plurality of equally spaced apertures 402, 302, and 203 on the cable lockout assembly 100 to prevent any unauthorized operation of the valve 501.

Figure 6:
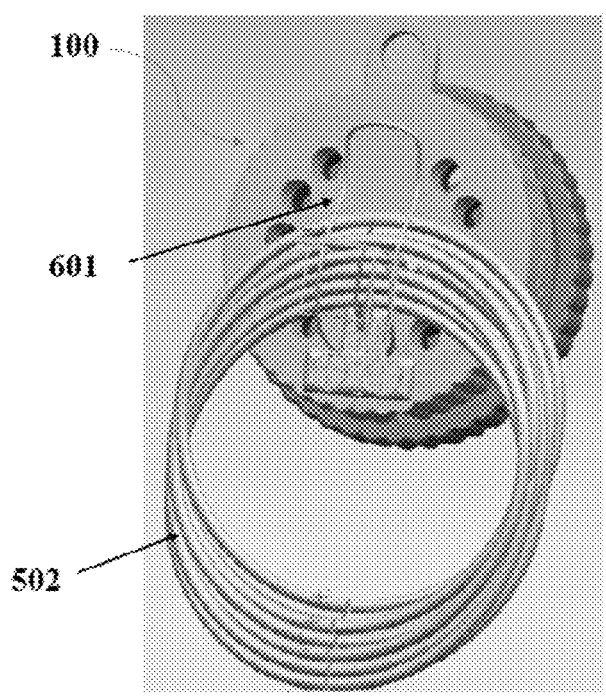
FIG. 6 depicts an S-shaped cable manager apparatus fixed on the cable lockout assembly in accordance with an embodiment of the present disclosure.

Referring to FIGS. 1 and 6, a generally S-shaped cable manager apparatus 601 can be disposed on the base 101 for holding wounded cable 502. The S-shaped cable manager apparatus 601 comprises an S-shaped clip 106 mounted to a rear face of the base 101 by means of a clamp plate 108 and a set of screws 107. As explained in the previous line the 'rear face' of the base 101 is the surface located opposite to the threaded protuberance 103. The S-shaped clip 106 is fixed to the rear face of the base 101 by the aid of a set of screws 107 mounted over the base 101 by a clamp plate 108 which holds the both free ends of the S shaped cable clip 106 together with the base 101. When the lockout assembly 100 is not in use, the cable 502 is wound manually and can be held into the S-shaped cable manager apparatus 601, thereby preventing loss of the cable 502 (as the cable lockout assembly 100 cannot work without the cable 502) and keeping the cable 502 available for further use.

In an embodiment, A hanger 202 can be integrated with the base 101 (as shown in FIG. 2). The hanger 202 can be used to hang the cable lockout assembly 100 when not in use.

An exemplary embodiment of the present disclosure relates to a cable lockout assembly 100 that is simple and easy to operate and can be used to lock valves or switches of very large to small size, varying from industrial to household. Further, the cable lockout assembly 100 of the present disclosure provides safety to humans and machines and prevents any unauthorized person from operating a critical machine or a special device by enabling locking of the cable lockout assembly 105 using one or more padlocks.

In the cable lockout assembly 100 of the present disclosure, the tool 104 can be fixed along with the rotatable piece 102 and padlocked, thus mitigating or at least reducing the chances of misplacing or losing the tool 104. Similarly, by using the S-shaped cable manager apparatus 601, cable 502 loss can be avoided and therefore downtime reduced allowing the user to easily store and manage the cable 502 for next operation.

Equivalents:

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A cable lockout assembly comprising:
   a base comprising a threaded protuberance extending centrally above the base and a through-passage extending between two diametrically opposite pair of openings formed on an outer peripheral wall of the base for inserting therethrough a cable;

a rotatable piece having a first central opening for receiving the threaded protuberance of the base; the rotatable piece is rotatable about axis of the threaded protuberance wherein the rotation of the rotatable piece axially moves the rotatable piece along the axis of the threaded protuberance relative to the base;

a tool, having a second central opening for receiving the threaded protuberance and a second profile engageable with a first profile of the rotatable piece wherein rotation of the tool by a user, causes rotation of said rotatable piece such that the rotatable piece moves towards the base thereby exerting a clamping force on a portion of the cable interposed between the rotatable piece and the base and wherein the second profile of the tool comprises an external gear profile, and the first profile of the rotatable piece comprises an internal gear profile engageable with the external gear profile of the first profile.

2. The cable lockout assembly as claimed in claim 1, wherein a stopper device is disposed at a distal end of the threaded protuberance to prevent the disengagement of the rotatable piece from the base.

3. The cable lockout assembly as claimed in claim 2, wherein the stopper device is a conical washer disposed on the distal end of the threaded protuberance.

4. The cable lockout assembly as claimed in claim 1, wherein the base has a plurality of spaced locking apertures alignable with a plurality of spaced locking apertures, disposed in the rotatable piece and tool respectively, for receiving a locking device to lock the relative rotation of the tool, the rotatable piece and the base.

5. The cable lockout assembly as claimed in claim 1, wherein the rotatable piece comprises a nut disposed centrally therein the nut having internal threads configured to engage with the threaded protuberance of the base.

6. The cable lockout assembly as claimed in claim 1, wherein the cable lockout assembly secures the cable in a looped configuration.

7. The cable lockout assembly as claimed in claim 1, wherein the lockout assembly further comprises a cable manager apparatus for holding the wound cable, wherein the cable manager apparatus comprises an S-shaped clip mounted on the base by means of a clamp plate and a set of screws.

* * * * *